Nov. 20, 1962     F. SLAMAR     3,065,415
CONTINUOUS GAGE
Filed Jan. 7, 1960     2 Sheets-Sheet 1
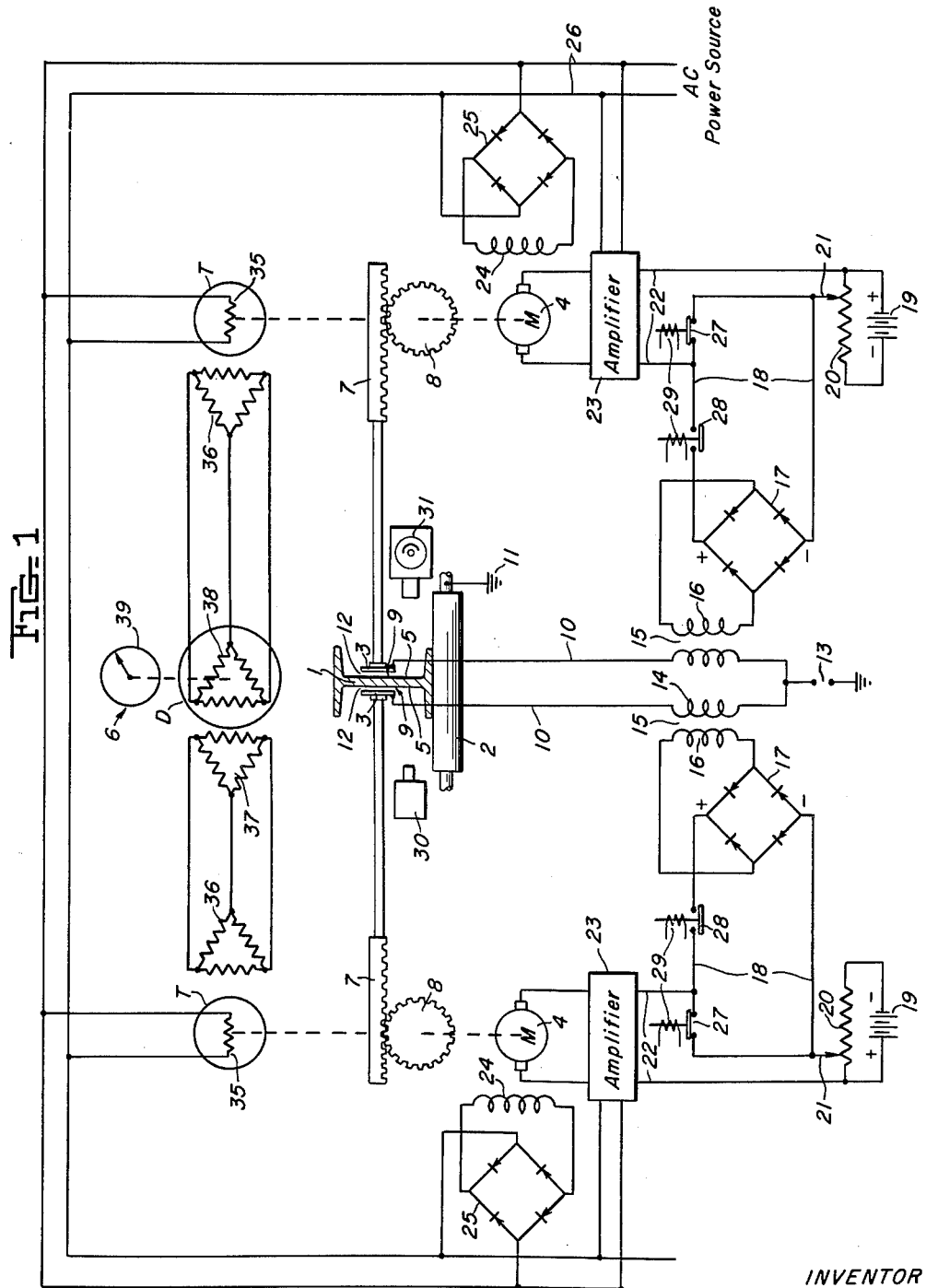
INVENTOR
FRANK SLAMAR
By Donald G. Dalton
Attorney Nov. 20, 1962 F. SLAMAR 3,065,415
CONTINUOUS GAGE
Filed Jan. 7, 1960 2 Sheets-Sheet 2
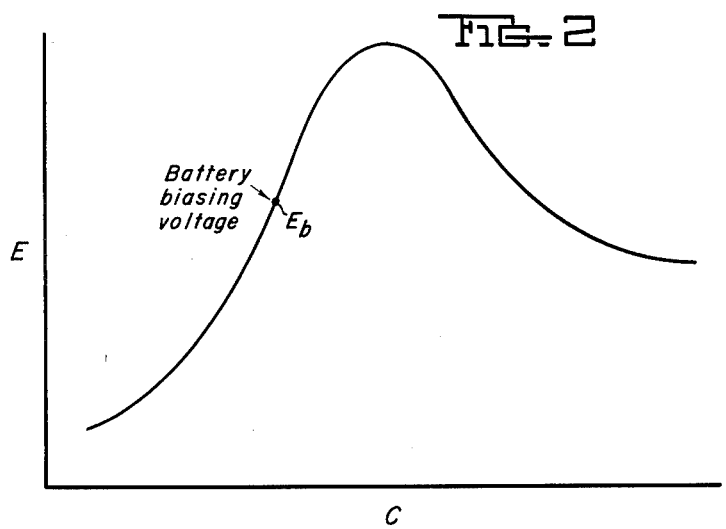
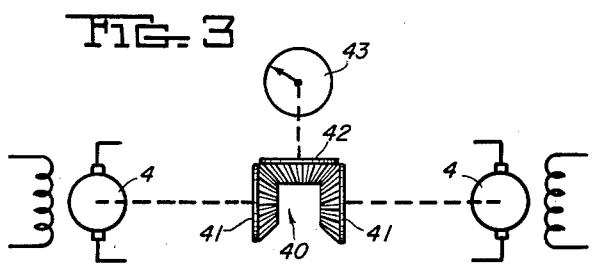
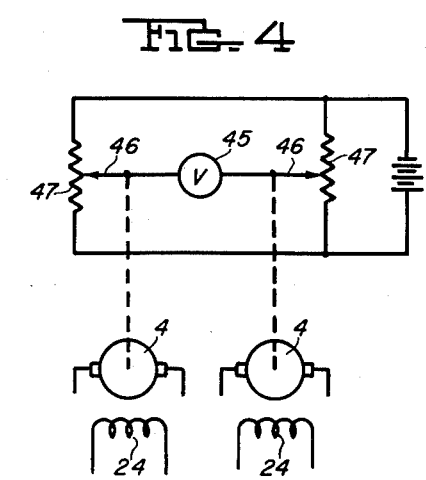
INVENTOR
FRANK SLAMAR
By Donald G. Dalton
Attorney

United States Patent Office 3,065,415
Patented Nov. 20, 1962

3,065,415
CONTINUOUS GAGE
Frank Slamar, Monroeville, Pa., assignor to United States Steel Corporation, a corporation of New Jersey
Filed Jan. 7, 1960, Ser. No. 1,000
8 Claims. (Cl. 324—61)

This invention relates to a gage for measuring the thickness of a metal plate between parallel surfaces thereof. It relates more particularly to a gage for continuously measuring the thickness of the flanges or web of a beam as it travels over a roller conveyor.

According to a preferred embodiment, the invention in its broad aspect comprises a pair of gage elements that are respectively disposed on opposite sides of a plate to be measured, and an electrical or mechanical differential mechanism operated by both gage elements to provide an indication of the thickness of the plate therebetween. In a manner to be described, the gage elements are moved to identical positions relative to opposite sides of the plate being measured, preferably at points spaced equal distances from the opposite sides of such plate, so that the differential mechanism provides an indication of the relative distance between the gage elements, and thus an indication of the thickness of the plate therebetween.

In a more specific aspect of the invention, the gage elements referred to above are capacitor terminals of condensers in which the opposite parallel surfaces of a plate being measured, for example, opposite surfaces of the flanges or web of a steel beam, are utilized as the other capacitor terminals thereof. Such condensers are connected respectively in tuned self-balancing series-resonant circuits, which are used to control the reversing operation of direct current drive motors that operate to move the gage elements or capacitor terminals to predetermined operative measuring positions in which they are respectively located equal distances from the surfaces of the plate being measured. When the gage elements are moved to these positions, the motor control circuits which include the series-resonant circuits and the condensers mentioned above, operate to stop the drive motors and to hold the movable capacitor terminals in their operative measuring positions. In addition, the drive motors for moving the capacitor terminals are mechanically connected to a differential indicator that operates to indicate the relative positions of such terminals and thus the thickness of the plate being measured. While the differential indicating mechanism may be either mechanical or electrical, it is preferably a synchro-tie system comprised of a pair of transmitter elements respectively coupled to the condenser adjusting drive motors, and a differential element that is coupled to both of the transmitter elements and operates to continuously indicate the relative movement imparted to the transmitter elements by the condenser adjusting drive motors, and thus indicates the relative positions of the movable capacitor terminals and thereby the thickness of the plate positioned therebetween.

The objects and advantages of the invention will become apparent from the following description and the accompanying drawings, which show a preferred embodiment of the invention and modifications of a differential indicating system that forms a part thereof. In the drawings:

FIGURE 1 is a diagrammatic showing of a preferred embodiment of the invention that illustrates the manner in which it is operated to continuously indicate the thickness of a plate travelling over a roller conveyor, the plate being in the form of the web of a steel beam;

FIGURE 2 is a graph illustrating the operating characteristics of each of the series-resonant circuits that form a part of the system shown in FIGURE 1, and the manner in which the mechanism shown therein is operated according to the principles of this invention; and FIGURES 3 and 4 are respectively diagrammatic views of modified forms of differential indicating apparatus that may be substituted for the differential indicator shown in FIGURE 1.

As shown in FIGURE 1 the gage of this invention is particularly adapted to continuously indicate the thickness of a metal plate 1 formed of electrically conductive material in the form of the web of a steel beam travelling continuously over conveyor rolls 2. Generally stated, the invention comprises a pair of gage elements 3 disposed on opposite sides of the plate 1, a pair of reversing drive motors 4 for driving the gage elements 3 to identical operative measuring positions relative to opposite parallel sides or surfaces 5 of the plate 1, in which the gage elements 3 are preferably at points respectively located predetermined distances from the surfaces 5, and a differential indicator, indicated as a whole by the numeral 6, which is operated by both motors 4 in a manner to be described to indicate the thickness of the metal between the parallel surfaces 5 of the plate 1.

The gage elements 3 are respectively mounted for rectilinear movement in a direction normal to the plate surfaces 5 by gear racks 7 that have meshing engagement with rack pinions 8, which are mechanically connected with and driven by the drive motors 4 through gear reducing units (not shown). The gage elements 3 further form the movable capacitor terminals of condensers 9 that form parts of series-resonant circuits 10 which respectively control the reversing operation of the motors 4 according to the capacities of the condensers 9 in a manner to be described. Each of the condensers 9 has as one capacitor terminal thereof a gage element 3 and, as its other capacitor terminal, one of the parallel plate surfaces 5 of the beam plate 1 which has a ground connection 11 through one or more of the conveyor rolls 2. Movement of the gage elements 3 toward and away from the surfaces 5 varies the air gaps 12 between the capacitor terminals 3 and 5 to thereby vary the capacities of the condensers 9 in the series-resonant circuits 10. Change in capacity of the condensers 9 by varying the position of the conductor terminals 3 and thereby the size of the air gaps 12 is utilized to control the operation of the drive motors 4 which operate through the pinion 8 and gear racks 7 to move the conductor terminals 3 to predetermined balanced positions with reference to the plate surfaces 5.

Each of the series-resonant control circuits 10 is energized from a high frequency source of supply 13 and comprises one of the condensers 9 connected in series with an inductor coil 14 that forms the primary of a transformer 15 that has a secondary winding 16. The terminals of the secondary winding 16 are connected to the input terminals of rectifiers 17 which have their output terminals connected with pairs of conductors 18 that respectively form part of control circuits for controlling the operation of the motors 4. The control circuit for each motor 4 comprises a direct current biasing potentiometer 19 that includes a resistor 20 and a slide wire contact 21 adjustable to different positions along the resistor 20 to vary the direct current biasing potential delivered through conductor leads 22 to an amplifier 23 that controls the armature current supplied to the drive motors 4. Each of the drive motors 4 has a field winding 24 that is energized by a rectifier 25 connected across A.C. supply buses 26. One of the amplifier leads 22 in each motor control circuit is connected with the biasing potentiometer slide wire 21 and has a normally closed contactor 27 therein, and one of the control circuit leads 18 has a normally open contactor 28 therein. The contactors 27 and 28 are operated by coils 29 that are energized by a photoelectric relay comprised of a light source 30 and a photoelectric cell 31. When a plate 1 is positioned between the photoelectric relay elements 30 and 31, the operating coils 29 are energized to open the relay contacts 27 and to close the relay contacts 28 and thus connect the slide wire contact 21 with the one of the amplifier leads 22 through the rectifier 17. Under this condition, the slide wire 21 and rectifier 17 of each motor control circuit are connected in series opposition to supply a motor control potential to the amplifier 23 according to the energization of the secondary windings 16 by the primary windings 14 of the series-resonant circuits 10. This results in an operation of the motors 4 that moves the capacitor 3 of the condensers 9 respectively to positions relative to the capacitor terminal surfaces 5 that are determined by the setings of the slide wire contacts 21. When these positions are reached, the outputs of the rectifiers 17 are balanced against the direct current bias potentials supplied by the slide wire contacts 21 so that no control current is supplied to the amplifiers 23 which thus interrupt the flow of armature current to the drive motors 4. Under this condition, the drive motors 4 stop and operate to hold the capacitor terminals 3 in a predetermined position relative to the plate surfaces 5.

The manner of operation of the series-resonant circuits 10 and the biasing potentiometers 19 will be best understood by referring to FIGURE 2 which shows the output voltage E plotted against the capacitance C of the series-resonant circuits 10. The slide wire potentiometer 21 is adjusted to provide a battery biasing voltage Eb which is less than the peak output of the control circuits 10. The polarity of the armature current fed to the motors 4 and their respective direction of rotation is thus dependent on the voltage E as determined by the capacities of the condensers 9. The motors 4 will thus operate to drive the movable capacitor terminals 3 to positions in which the series-resonant circuit output voltages E are equal to the direct current biasing voltages Eb. When this balanced condition is obtained, the relative distance between the capacitor terminals 3 of the condensers 9 furnishes an indication of the thickness of the plate 1 between its parallel surfaces 5.

As indicated above, the thickness of the plate 1 is indicated by a differential indicator 6. As shown in FIGURE 1 of the drawings, the differential indicator, according to the preferred embodiment of the invention, is a synchro-tie system which comprises a pair of transmitter elements T and a differential element D. The transmitter elements T each comprise single phase rotors 35, the windings of which are connected across the alternating current supply buses 26, and polyphase stator windings 36. The stator windings 36 have a transformer coupling with each other through the polyphase stator winding 37 and polyphase rotor winding 38 of the differential element D. The rotors 35 of the transmitter elements T are provided with mechanical connections to the drive motors 4 through the gears 8 and a gear reduction drive (not shown). In this manner, the rotors 35 are driven to angular positions which correspond to the relative positions of the gage elements or capacitor terminals 3 relative to the plate surfaces 5, and the rotor 38 of the differential element D is rotated to a position that represents the angular difference in the positions of the rotors 35 of the transmitter elements T, and this angular difference furnishes an indication of the distance between the capacitor terminals 3 and thus the thickness of the plate 1 between its parallel surfaces 5. An indicator 39 is operated by the rotor 38 and is calibrated to furnish an indication of the thickness of the plate 5.

As shown in FIGURE 3 of the drawings, a mechanical differential mechanism, comprising a differential gear unit 40 may be substituted for the synchro-tie system shown in FIGURE 1. The gear unit 40 comprises a pair of bevel gears 41 which are mechanically connected with the motors 4 for rotation thereby, preferably through gear reducing units (not shown). A differential gear 42 has meshing engagement with each of the gears 41 so that its angular position represents the difference between the relative rotation of the gears 41 and thus furnishes an indication of the distance between the gage elements 3. The differential bevel gear 42 is connected with an indicator 43 which is calibrated to furnish an indication of the thickness of the plate 1.

In the modification shown in FIGURE 4, the indication of thickness of the plate 1 is furnished by a voltmeter 45 that has its terminals connected with movable slide wires 46 adjustable along the length of potentiometer resistors 47. The slide wires 46 are connected through gear reducing units (not shown), with the drive motors 4 so that their relative positions along the potentiometer resistors 47 furnish an indication of the relative movement of the gage elements 3 by the motors 4. The deflection of the voltmeter 45 will thus furnish an indication of the distance between the gage elements 3 and thereby an indication of the thickness of the plate 1 between its parallel surfaces 5.

Since the operation of the apparatus of this invention will be apparent from the foregoing, it will be sufficient to indicate that the relay contactors 27 and 28 are operated to place the motors 4 under the control of the series-resonant circuits 10 whenever a plate 5 is positioned between the photoelectric relay elements 30 and 31 and thus operates to interrupt the beam of light from the light source 30 to the photosensitive element 31. When the relay contactors 27 and 28 are operated in this manner, the motors 4 rotate in directions that move the gage elements 3 to positions in which the rectified outputs of the series-resonant circuits 10 operate to produce direct current potentials that are balanced against the outputs of the direct current biasing potentiometers 19. When this balanced condition is obtained, the gage elements 3 are respectively located in positions respectively spaced predetermined distances from the opposite plate surfaces 5 of the plate 1, and in which the distance between the gage elements 3 thus furnishes an indication of the thickness of the plate 1. This thickness is indicated by the differential indicators 6 as explained above.

While the gage elements 3 are movable capacitor terminals of the condensers 9 in the preferred embodiment of the invention as explained above, it will be understood that the invention is capable of modification to a mechanical system in which the gage elements 3 are moved to positions in contact with the surfaces 5. A modification of this character could be provided, for example, by substituting roller contacts for the gage elements 3 and by providing a spring for biasing the movement of the gear racks 7 to positions in which such roller contacts have rolling engagement with the surfaces 5. In such case, inward and outward movement of the gear racks 7 in response to changing thickness of the plate 1 would operate through the gears 8 to actuate the differential indicator 6 and furnish an indication of the thickness of the plate 1.

While one embodiment of my invention has been shown and described it will be apparent that other adaptations and modifications may be made without departing from the scope of the following claims.

I claim:

1. An apparatus for measuring the thickness between parallel surfaces of a plate formed of electrically conductive material comprising, the combination with said plate, of a pair of series-resonant circuits respectively including an inductor and a condenser connected in series, each of said condensers comprising one of said plate surfaces as one capacitor terminal thereof and a second capacitor terminal spaced from and mounted for movement toward and away from said one capacitor terminal, said second capacitor terminals being disposed on opposite sides of said plate, means including separate motor drives for moving said second capacitor terminals relative to said one capacitor terminals, separate motor control means operated by said series-resonant circuits respectively for operating said motor drives to move said second capacitor terminals to operative measuring positions located predetermined distances respectively from said one capacitor terminals and in which the capacities of said condensers have a predetermined value, and differential means actuated by said motor drives for indicating the relative distance between said second capacitor terminals and thereby the thickness of said plate.

2. An apparatus as defined in claim 1 characterized by said differential means being a differential synchro-tie system comprising a pair of transmitters respectively having rotor windings connected with said motor drives for rotation thereby and stator windings, a differential receiver having a stator winding connected with one of said transmitter stator windings and a rotor winding connected with the other of said transmitter stator windings, and a plate thickness indicator connected for operation by said differential receiver rotor winding.

3. An apparatus as defined in claim 1 characterized by said differential means being a differential gearing comprising a pair of bevel gears connected with said motor drives for rotation thereby, a differential bevel gear in meshing engagement with both of said bevel gears, and a plate thickness indicator connected with said differential bevel gear for operation thereby.

4. An apparatus as defined in claim 1 characterized by said differential means comprising a pair of potentiometers respectively including a resistor and a slide wire contact adjustable over the length thereof, means connected with said motor drives for moving said slide wire contacts along the length of said resistors in accordance with the movement imparted by said motor drives to said second capacitor terminals, and a voltmeter connected in series with said slide wire contacts for indicating the thickness of said plate.

5. An apparatus for continuously measuring the thickness between parallel surfaces of a plate formed of electrically conductive material comprising, the combination with said plate, of a pair of condensers respectively comprising one of said plate surfaces as one capacitor terminal thereof and a second capacitor terminal spaced from and mounted for movement toward and away from said one capacitor terminal, means including separate motor drives for moving said second capacitor terminals relative to said one capacitor terminals, and separate means controlling the operation of each of said motor drives respectively comprising a series-resonant circuit including one of said condensers and an inductor connected in series therewith, a control circuit energized by said series-resonant circuit including means for producing a direct current potential that varies with the capacity of said one condenser, and separate means respectively respectively responsive to said direct current potentials for operating said motor drives to move said second capacitor terminals to predetermined positions spaced equal distances from said plate capacitor surfaces, and differential means actuated by said motor drives for indicating the relative distance between said second capacitor terminals and thereby the thickness of said plate.

6. An apparatus as defined in claim 5 characterized by the provision of means responsive to the presence of a plate between said second capacitor terminals for rendering said motor drive control means operative, and operating to render said motor drive control means inoperative when said plate moves out of the space between said second capacitor terminals.

7. An apparatus as defined in claim 6 characterized further by said plate responsive means comprising a photo-electric relay.

8. An apparatus as defined in claim 5 characterized by each of said motor drive control means comprising adjustable biasing means connected in series opposition with said direct current producing means for adjusting the said predetermined position to which said second capacitor terminals are moved by their respective motor drives.

References Cited in the file of this patent

UNITED STATES PATENTS

| | | |
|---|---|---|
| 2,548,590 | Cook | Apr. 10, 1951 |
| 2,831,254 | Phillips et al. | Apr. 22, 1958 |
| 2,930,976 | Hirdler | Mar. 29, 1960 |

FOREIGN PATENTS

| | | |
|---|---|---|
| 207,792 | Australia | Dec. 14, 1954 |